US006299366B1

United States Patent
Hasegawa

(10) Patent No.: US 6,299,366 B1
(45) Date of Patent: *Oct. 9, 2001

(54) KEYBOARD ROTATABLE TO VERTICAL POSITION ABOVE DESK

(75) Inventor: Takumi Hasegawa, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,455

(22) Filed: Jun. 8, 1999

(30) Foreign Application Priority Data

Jun. 9, 1998 (JP) .................................. 10-160797

(51) Int. Cl.$^7$ ................................................. A47B 46/00
(52) U.S. Cl. ........................................ 400/472; 248/284.1
(58) Field of Search ..................................... 400/715, 682, 400/82, 489, 472; 341/22; 248/284.1

(56) References Cited

U.S. PATENT DOCUMENTS

| | | | |
|---|---|---|---|
| 4,704,604 | * 11/1987 | Fuhs ......................................... | 361/680 |
| 4,718,740 | * 1/1988 | Cox ........................................... | 312/223.2 |
| 5,040,760 | * 8/1991 | Singer ...................................... | 248/284 |
| 5,055,839 | * 10/1991 | Davis et al. ............................. | 341/22 |
| 5,629,832 | * 5/1997 | Sellers ..................................... | 361/680 |
| 5,661,605 | * 8/1997 | Conway ................................... | 361/680 |
| 5,823,487 | * 10/1998 | Kirchhoff et al. ..................... | 248/118 |
| 5,961,231 | * 10/1999 | Ambrose ................................. | 400/472 |

FOREIGN PATENT DOCUMENTS 60-180029    11/1985    (JP) .
63-97121     6/1988     (JP) .

* cited by examiner

Primary Examiner—Daniel J. Colilla
(74) Attorney, Agent, or Firm—Foley & Lardner

(57) ABSTRACT

A keyboard comprises two stand portions fixed to a desk or the like, and a keyboard body connected to a computer and supported by the stand portions. Each of the stand portions has a first stand member fixed to the desk or the like, and a second stand member, one end of which is fixed to one side surface of the keyboard body and the other end of which is rotatably supported, at one end of the first stand member, by a pivot which is part of a supporting and fixing member.

8 Claims, 2 Drawing Sheets

KEYBOARD ROTATABLE TO VERTICAL POSITION ABOVE DESK

BACKGROUND OF THE INVENTION

The present invention relates to a keyboard connected to a computer, and more particularly to a keyboard whose occupied space on a desk or the like can be reduced when it is not in use.

In the case where a conventional computer is placed and used on a desk, a keyboard attached to the computer occupies quite a large space, thereby becoming an obstruction to other work on the desk. As a result, some ideas have been adopted, one of which is that a keyboard is stood against a computer when it is not in use. However, conventional keyboards are not designed so as to be stood against something, so that they are liable to fall down due to feeble vibrations and impacts when they are leaned against computers. This may cause a failure or breakage of the keyboards.

SUMMARY OF THE INVENTION

An object of the present invention is therefore to provide a keyboard that is free from the above-mentioned disadvantage of the conventional keyboards and allows a predetermined space to be secured on a desk when the keyboard is not in use.

According to an aspect of the present invention, there is provided a keyboard which comprises: a keyboard body; and one or more stands fixed to a place to allow the keyboard body to be vertically supported above the place.

Each of the one or more stands comprises: a first stand member fixed to the above-mentioned place; a second stand member coupled to the keyboard body and rotatably supported by the first stand member; and a fixing means for fixing the first stand member to the second stand member when the second stand member is rotated by a desired angle.

The fixing means fixes the first stand member to the second stand member by means of frictional engagement, a magnetic force, or a locking function.

BRIEF DESCRIPTION OF THE DRAWINGS

Other features and objects will become apparent from the following description when taken in conjunction with the accompanying drawings, in which.

In the drawings, the same reference numerals represent the same structural elements, respectively.

DETAILED DESCRIPTION OF THE PREFERRED EMBODIMENT

Description will next be given of the present invention in more detail.

Figure 1:
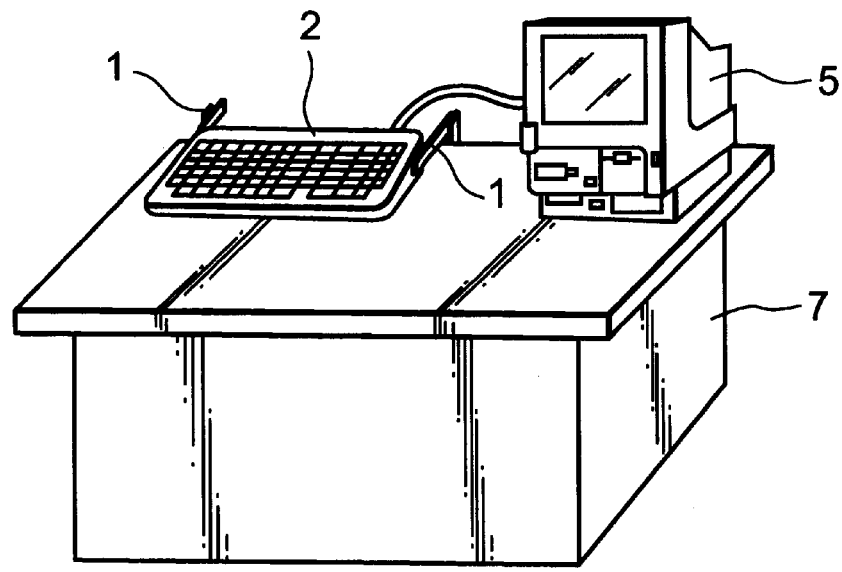
FIG. 1 is a perspective view of an embodiment of the present invention.
Figure 2:
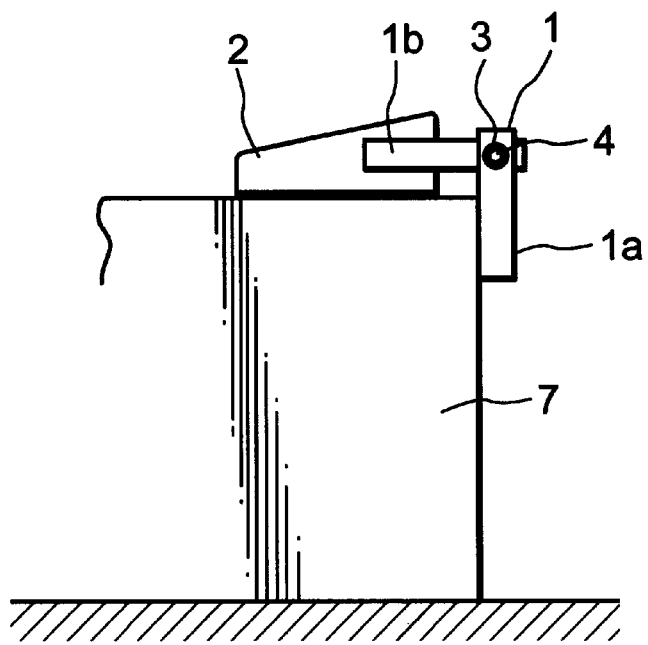
FIG. 2 shows a side view of the embodiment of the present invention.
Figure 4:
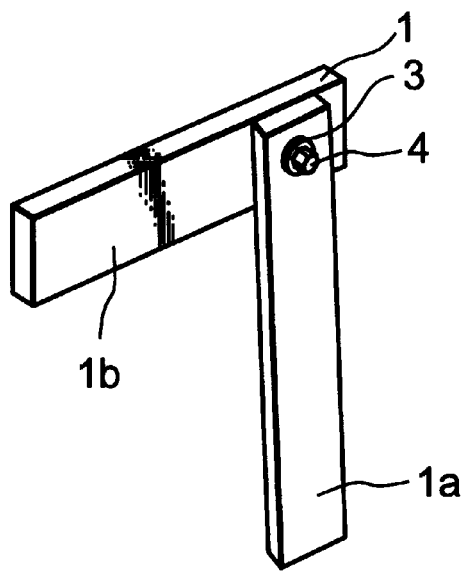
FIG. 4 shows a perspective view of a stand 1.

Referring to FIGS. 1 and 2, an embodiment of the present invention comprises two stand portions 1 fixed to a desk 7 or the like, and a keyboard body 2 connected to a computer 5 and supported by the stand portions 1. As shown in FIG. 4, each of the stand portions 1 includes a first stand member 1a fixed to the desk 7 or the like, and a second stand member 1b, one end of which is fixed to one side surface of the keyboard body 2 and the other end of which is rotatably supported, at one end of the first stand member 1a, by a pivot 4 of a supporting and fixing means 3. The first stand member 1a can be fixed to the desk 7 by any of a variety of known fixing means.

Figure 3:
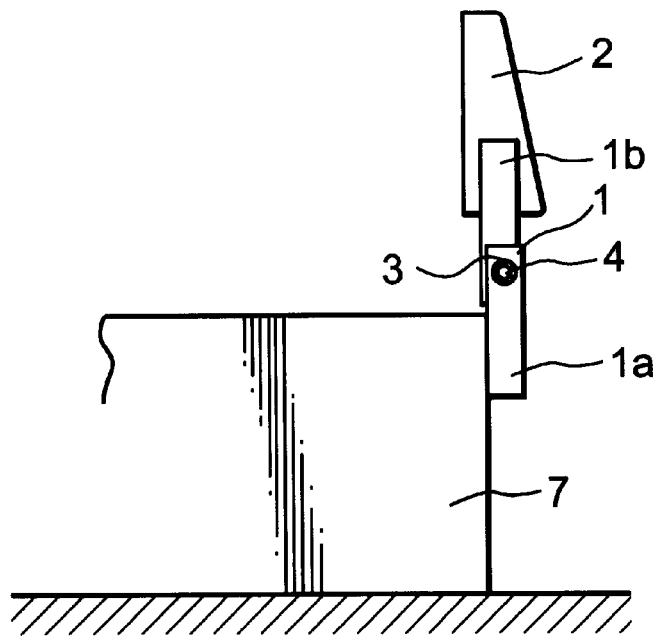
FIG. 3 is a side view of the embodiment when a keyboard body 2 is placed vertically.

The supporting and fixing means 3 has a mechanism for supporting and fixing the keyboard body 2 as follows. That is, when the body 2 is disposed in a vertical position as shown in FIG. 3 by rotating the member 1b on the pivot 4 by a desired angle, the means 3 supports and fixes the body 2 in such a vertical position by means of frictional engagement, a magnetic force or a locking function.

As a mechanism utilizing frictional engagement, the following structure can be adopted. For example, a ring made of rubber having a high coefficient of friction is fitted onto the pivot 4, and the pivot 4 with the ring is inserted into holes formed in the stand members 1a and 1b. This structure allows the keyboard body 2 to be disposed vertically (FIG. 3) by means of contact friction between the ring and the inner walls of the holes.

Further, as a mechanism utilizing a magnetic force, the following structure can be adopted. Magnets 8a and 8b attracting, each other are provided on the members 1a and 1b, respectively, (FIG. 5) or a magnet is provided on one of the members 1a and 1b and a strip made of a magnetically sensitive substance such as a ferrite is provided on the other member, and the stand members 1a and 1b are fixed together by means of the magnetic force with the keyboard 2 disposed vertically.

Still further, as a mechanism utilizing a locking function, a semi-fixing means based on a well-known quick stop structure a which is shown in FIG.6 can be adopted, or the stand members 1a and 1b may be fixed together with the keyboard body 2 disposed vertically by simply using a mechanically engaging means.

While the stands 1 are fixed to the desk 7 in this embodiment, the stands 1 may be fixed to the computer 5 in such a manner that the body 2 can be vertically disposed whenever necessary. For example, the stands 1 maybe fixed in such a manner that part of them is inserted between the upper surface of the desk 7 and the computer 5 or between the main body of the computer 5 and a display unit placed on the main body.

What is claimed is:

1. A keyboard comprising:
   a keyboard body which is capable of being placed directly on a top surface of a desk;
   a first stand member which is fixed to a side surface of the desk; and
   a second stand member which is coupled to said keyboard body, and which is rotatably supported by said first stand member between a horizontal position on the top surface of the desk and a vertical position above said first stand member and not on the top surface of the desk.

2. The keyboard as claimed in claim 1, further comprising:
   a fixing means for fixing said first stand member to said second stand member when said second stand member is rotated by a desired angle.

3. The keyboard as claimed in claim 2, wherein said fixing means fixes said first stand member to said second stand member by means selected from the group consisting of frictional engagement and a magnetic force.

4. The keyboard as claimed in claim 2, wherein said desired angle is 90 degree from a horizontal position.

5. The keyboard as claimed in claim 1, further comprising:
   a fixing member which fixes said first stand member to said second stand member by means selected from the group consisting of frictional engagement and a magnetic force.

6. The keyboard as claimed in claim 1, wherein no portion of said one or more stands rests against a top portion of said desk.

7. The keyboard as claimed in claim 1, wherein said side surface is one of right, left and back side surfaces of the desk.

8. The keyboard as claimed in claim 7, wherein said side surface is not a bottom surface of said desk that is disposed opposite to said top surface of said desk.

* * * * *